United States Patent Office 3,357,720
Patented Dec. 12, 1967

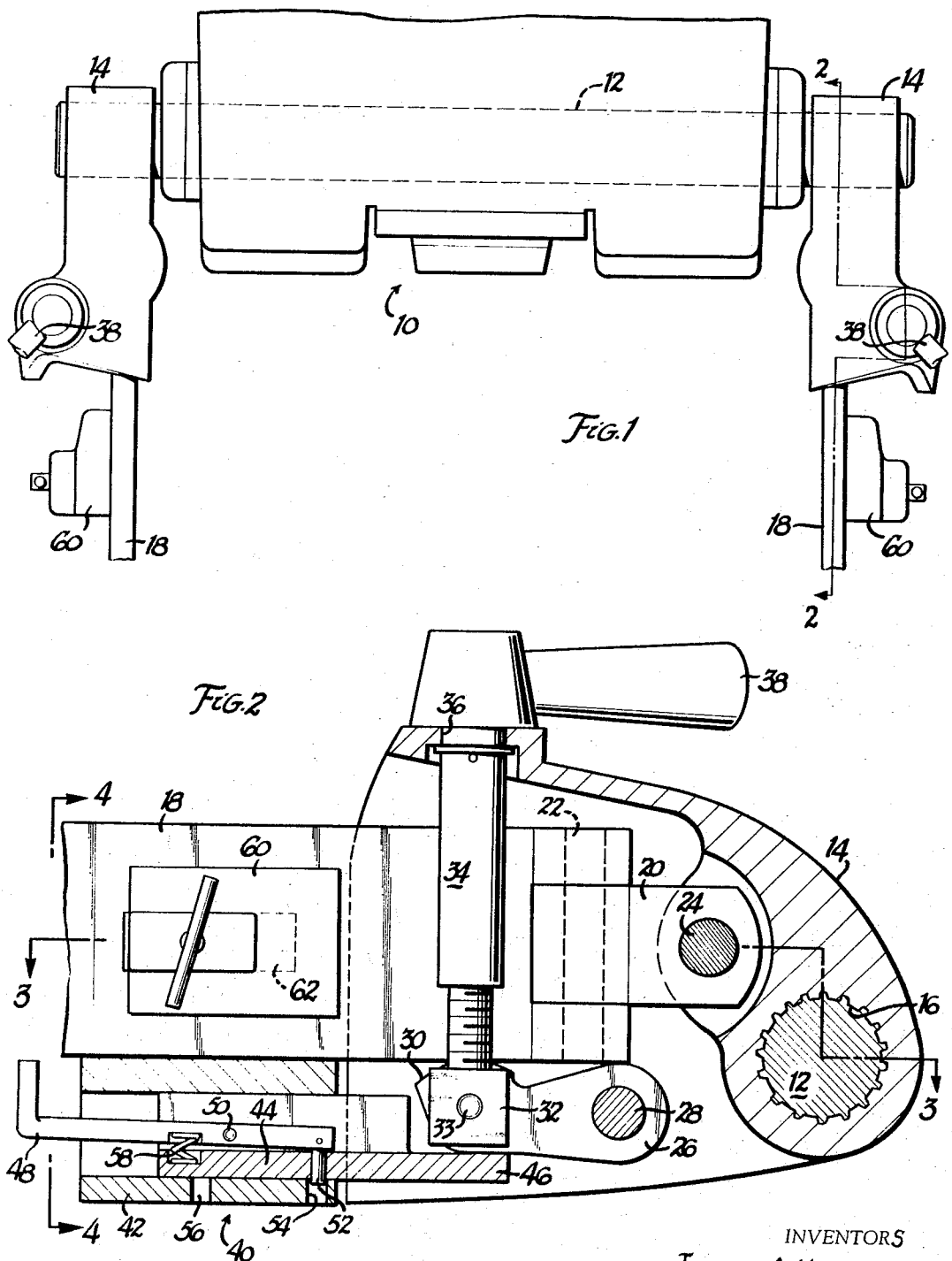

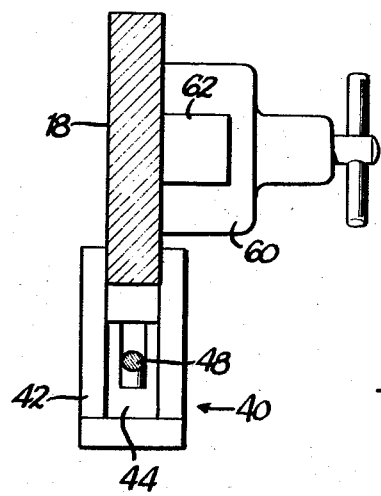
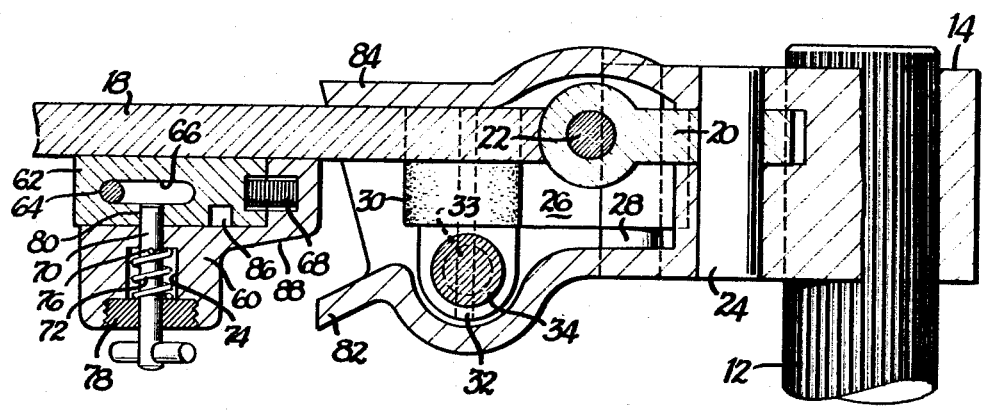

3,357,720
DRAFT ARM, FLOAT-NON-FLOAT, SWAY-NON-SWAY, AND LEVELING ADJUSTMENT
Joseph A. Kulhavy and Alfred A. Wridt, Racine, Wis., assignors to J. I. Case Company, Racine, Wis., a corporation of Wisconsin
Filed Mar. 9, 1966, Ser. No. 533,043
4 Claims. (Cl. 280—474)

This invention relates to draft systems of the type employed to couple earth working implements to tractors, and more particularly to improvements in draft arm assemblies employed in systems of the foregoing type.

The invention is especially directed to draft assemblies of the type wherein a pair of draft arms are coupled to opposite ends of a rockshaft journalled for rotation in a tractor frame. This arrangement is one frequently employed in systems in which the draft arms are not only employed to couple the implement to the tractor but in which the draft arms may also be employed to raise or lower the implement relative to the ground by power driven rotation of the rockshaft to which the draft arms are coupled. The present invention is especially directed to draft arm assemblies in which the draft arms may selectively be locked into substantial rigidity with the rockshaft or alternatively may be permitted a limited amount of motion relative to the rockshaft as is desirable under some working conditions.

It is one object of the present invention to provide a draft arm assembly wherein the draft arms may be rigidly locked to or alternatively may be permitted a limited range of movement relative to a rockshaft.

It is another object of the invention to provide a draft arm assembly wherein the angular relationship of the draft arms to the rockshaft may be easily adjusted or varied in the field.

The foregoing, and other objects, are achieved in a draft arm assembly in which a rigid draft arm housing is fixedly mounted upon a tractor carried rockshaft. The draft arm itself is in turn coupled to the housing for movement relative to the housing about both horizontal and vertical axes. The assembly includes a leveling adjustment by means of which the angular relationship of the draft arms to the rockshaft axis may be adjusted either to align the two draft arms at opposite ends of the rockshaft or to angularly offset the two draft arms from each other if desired. The assembly further includes a first releasable locking mechanism which, when in its locked position prevents pivotal movement of the draft arm relative to the housing about its horizontal axis, and a second releasable locking mechanism which, when in its locked position, effectively locks the draft arm against movement relative to the housing about its vertical axis.

Other objects and features of the invention will become apparent by reference to the following specification and to the drawings.

In the drawings:

FIGURE 1 is a top plan view, with certain parts broken away or omitted showing a draft arm assembly embodying the present invention;

FIGURE 2 is a detail cross sectional view taken approximately on line 2—2 of FIGURE 1, but showing in addition a side elevational view of the sway shoe assembly in place on the draft arm;

FIGURE 3 is a detail cross sectional view taken on line 3—3 of FIGURE 2; and

FIGURE 4 is a cross sectional view, with certain parts omitted, taken approximately on line 4—4 of FIGURE 2.

Referring first to FIGURE 1, there is shown a plan view of the rear end of a tractor designated generally 10 within which a horizontally extending rockshaft 12 is journalled for rotation about its axis. Rockshaft 12 projects outwardly beyond each side of the tractor frame, and a pair of draft arm housings 14 are fixedly secured, one at each end of the rockshaft, as by a spline connection 16 (FIGURE 2). Housings 14 differ from each other only in being right and left handed, and the following description of the right hand housing 14 and its associated parts is equally applicable to the left hand housing 14 and corresponding parts, one being a mirror image of the other.

A draft arm 18 is coupled at its forward end to the housing 14 by structure described in more detail below, and projects rearwardly from the housing to provide a means by which an implement, not shown, may be coupled to the tractor frame 10. The various elements at the rearward end of draft arms 18 are conventional, and hence have not been illustrated, since the present invention is entirely concerned with structure located at the forward end of the draft arms.

In normal usage, rockshaft 12 may be rotated about its axis, as by power lift cylinders, not shown, to raise or lower an implement attached to the rearward ends of draft arms 18.

As best seen in FIGURES 2 and 3, draft arm 18 is pivotally connected at is forward end to a relatively short link 20 for pivotal movement about a substantially vertical axis by a pivot pin 22. Link 20 is in turn pivotally connected to housing 14 for pivotal movement about a horizontal axis by means of a pivot pin 24 which passes through link 20 and is journalled for rotation in housing 14. Draft arm 18 is thus supported in housing 14 for pivotal movement relative to the housing about a horizontal axis corresponding to the axis of pin 24 and a substantially vertical axis corresponding to the axis of pivot pin 22. Pivotal movement of draft arm 18 relative to housing 14 about these latter axes may be constrained or adjusted by structure to be described below.

The first of the various adjustments present in the structure shown in the drawings is a leveling adjustment which functions to establish a rest position of draft arm 18 about the axis of pin 24, to thereby establish a normal angular relationship of the draft arm relative to the axis of rockshaft 12. Because the normal draft system employs two arms 18 located at opposite ends of the rockshaft, the leveling adjustment may be employed to locate these arms in angular alignment with each other relative to the rockshaft axis, or in some instances to provide a desired angular offset relationship between the two arms if it is desired to operate an implement in a tilted position.

The leveling adjustment includes a crank arm 26 which is pivotally supported within housing 14 as by a pivot pin 28. Arm 26 is located below the forward end of draft arm 18, and is formed with a curved seat 30 upon draft arm 18 rests. As best seen in FIGURE 3, seat 30 is of substantial horizontal extent and projects outwardly beyond draft arm 18 to support arm 18 throughout its full range of movement about vertical pivot 22. A swivel boss 32 is mounted on the outer side of arm 26 as by a pivot pin 33 and a tapped bore in boss 32 receives a leveling screw 34 which is mounted for rotation in fixed axial relationship to housing 14 in a bore 36 which passes through the top of the housing. Screw 34 projects upwardly above the top of the housing, and a handle 38 is mounted on the upper end of the screw to assist in rotating the screw. It is belived apparent that upon rotation of screw 34, arm 26 can be adjustably positioned about its pivot 28, and the position of arm 26 about its pivot 28 determines, in turn, the position of rotative adjustment of draft arm 18 about pivot 24. The weight at the outboard or distal end of the draft arm is sufficient to maintain draft arm 18 in seated engagement upon seat 30.

Draft arm 18 may be selectively locked into its rest position, or released to provide a floating action of the draft arm by a float-nonfloat mechanism designated generally 40. Mechanism 40 includes a U-shaped housing 42 which is fixedly secured to draft arm 18, as by welding, to project downwardly below the draft arm in spaced relationship to the rear end of housing 14. A second U-shaped member 44 is slidably mounted within the interior of housing 42. At the forward end of U-shaped member 44, the side walls are cut away to permit the bottom wall to project forwardly to serve as a locking tongue 46 which can be projected, at one setting of mechanism 40, beneath arm 26 to positively clamp arm 18 against seat 30. A detent actuating rod 48 is mounted between the side walls of U-shaped member 44 by a pivot pin 50 and carries a downwardly projecting detent pin 52 at its forward end, pin 52 passing downwardly through a bore in the bottom wall of member 44. A pair of detent bores 54 and 56 are formed in the bottom wall of U-shaped member 42 to receive the lower end of pin 52. Rod 48 is biased by a bias spring 58 about pivot pin 50 in a direction urging detent pin 52 downwardly into the respective detent bores.

In FIGURE 2, the float-nonfloat mechanism is shown in its nonfloat position in which draft arm 18 is locked against relative movement about pivot pin 24 by the engagement of locking tongue 46 with the lower side of arm 26. To permit a floating operation of draft arm 18, the rearward end of detent rod 48 is pressed downwardly to elevate pin 52 clear of detent bore 54. When pin 52 is clear of bore 54, U-shaped member 44 can be drawn rearwardly or to the left as viewed in FIGURE 2 until detent pin 52 can be seated in detent bore 56 by releasing rod 48. When pin 52 is seated in bore 56, locking tongue 46 is drawn clear of underlying relationship with arm 26 and draft arm 18 is thus released for pivotal movement about pivot 24 above the lower limit of movement established by the position of arm 26.

The structure further includes a sway-nonsway adjustment which may be positioned to selective block or release draft arm 18 for horizontal pivotal movement about pin 22. The sway-nonsway mechanism includes a shoe-like block 60 which is supported for longitudinal sliding movement along the outer side of draft arm 18 upon an elongate lug 62 fixedly secured as by welding to the side of draft arm 18. As best seen in FIGURE 3, shoe 60 is retained in place upon lug 62 by a pin 64 fixed in shoe 60 which passes through an elongate slot 66 formed in lug 62. A compression spring 68 is seated between the forward end of lug 62 and the inner side of the toe portion of shoe 60 to bias shoe 60 to the right as viewed in FIGURES 2 and 3.

Shoe 60 may be selectively locked in either of two positions longitudinally of draft arm 18 by a detent assembly which includes a detent pin 70 slidably mounted within shoe 60. Pin 70 is normally biased toward lug 62 by a compressed spring 72 located in a recess 74 formed in shoe 60. A pin 76 is fixedly secured to pin 70 and spring 72 acts between pin 76 and a cap 78 threadably received within shoe 60. In the position shown in the drawings, shoe 60 is located at its sway position. In this position, pin 70 is seated in the rearwardmost bore 80 in lug 62, and shoe 60 is withdrawn clear of a rearwardly projecting skirt 82 formed on housing 14. With shoe 60 in this position, draft arm 18 is free to pivot about pivot 22 between in limits established by the inner wall of skirt 82 and an opposed skirt portion 84 formed on housing 14.

To establish draft arm 18 in a nonsway condition, detent pin 70 is withdrawn from bore 80, and shoe 60 is driven forwardly by spring 68 until pin 70 is seated in the forward notch 68 formed on lug 62. When shoe 60 is in its nonsway position, an inclined surface 88 on the shoe engages the correspondingly inclined inner surface of skirt 82, thereby locking draft arm 18 against pivotal movement about pin 22.

While one embodiment of the invention has been described in detail, it will be apparent to those skilled in the art that the foregoing embodiment may be modified. Therefore, the foregoing description is to be considered exemplary rather than limiting, and the true scope of the invention is that defined in the following claims.

We claim:

1. In a draft arm assembly for coupling an implement to a tractor having a rockshaft journalled for rotation in the tractor frame, a pair of draft arms, and means coupling said draft arms to the opposite ends of said rockshaft for movement therewith; the improvement wherein each of said coupling means comprises a housing fixedly secured to the rockshaft for movement therewith, pivot means coupling the draft arm to said housing for pivotal movement relative to the housing about a horizontal and a vertical axis, first means mounted in said housing for adjustably positioning said draft arm at a selected rest position of rotative adjustment about said horizontal axis, and second means operable in a first position in engagement with said first means to lock said shaft arm against rotation about said horizontal axis from said rest position and operable in a second position to permit rotation of said draft arm about said horizontal axis to and from said rest position.

2. In a draft arm assembly as defined in claim 1; the improvement wherein said housing comprises a pair of opposed rearwardly horizontally divergent skirt portions at each side adjacent its rearward end, shoe means mounted upon said draft arm for movement into and out of the rearward end of said housing, and means for selectively locking said shoe means in either of a sway position wherein said shoe means is clear of said housing to permit pivotal movement of said draft arm about said vertical axis and a nonsway position wherein said shoe means projects into said housing to block said draft arm and shoe means between said skirt portions to prevent pivotal movement of said draft arm about said vertical axis.

3. In a draft arm assembly as defined in claim 1; the improvement wherein said first means comprises a crank arm mounted in said housing beneath said draft arm for pivotal movement about a horizontal axis, seat means on said crank arm engageable with the bottom of said draft arm to establish a lower limit of pivotal movement of said draft arm about the horizontal axis of said pivot means, and means for positioning the crank arm of selected positions of pivotal adjustment within said housing.

4. In a draft arm assembly as defined in claim 3; the improvement wherein said second means comprises a locking tongue mounted upon said draft arm for sliding movement longitudinally along said draft arm between said first and second positions, said locking tongue engaging the lower side of said crank arm when said tongue is in said second position.

References Cited

UNITED STATES PATENTS

| | | | |
|---|---|---|---|
| 2,673,506 | 3/1954 | Miller et al. | 172—450 X |
| 2,935,147 | 5/1960 | Edman et al. | 172—450 |
| 3,047,076 | 7/1962 | Wier et al. | 172—450 |
| 3,207,259 | 9/1965 | Harper | 280—460 |

LEO FRIAGLIA, *Primary Examiner.*